United States Patent Office

2,759,950
Patented Aug. 21, 1956

---

2,759,950
DYESTUFFS OF THE PHTHALOCYANINE SERIES

Arnold Tartter, Lambsheim, Germany, assignor to Badische Anilin- & Soda-Fabrik Aktiengesellschaft, Ludwigshafen (Rhine), Germany No Drawing. Application December 1, 1951,
Serial No. 259,483

Claims priority, application Germany December 20, 1950

12 Claims. (Cl. 260—314.5)

This invention relates to dyestuffs of the phthalocyanine series.

I have found that new dyestuffs of the phthalocyanine series are obtained by reacting the salts of phthalocyanines containing mercapto groups with salts of halogen carboxylic or halogen sulphonic acids or their functional derivatives or by reacting halogenphthalocyanines, in particular halogenmethylphthalocyanines, with salts of carboxylic or sulfonic acids containing mercapto groups or their functional derivatives, and if desired converting the resulting products by known methods into ternary sulfur compounds.

Suitable phthalocyanines containing mercapto groups are for example di-, tri- or tetra-mercapto-copper-phthalocyanine, mono-, di- or tri-mercapto-cobalt- or -iron-phthalocyanine, di-, tri-, tetra- or penta-(mercaptomethyl)-copper-phthalocyanine, mono-, di- or tri-(mercaptomethyl)-cobalt- or -nickel-phthalocyanine or the metal-free di- or tri-(mercaptomethyl)-phthalocyanines.

Among halogen carboxylic acids or halogen sulphonic acids there may be mentioned for example chloracetic acid, bromacetic acid, alpha- or beta-chlorpropionic acid, alpha- or gamma-bromobutyric acid, omega-chlorvaleric acid, chlorethane sulfonic acids, chlorbenzoic acids or chlorbenzene sulfonic acids or amides, or the esters or nitriles corresponding to the said carboxylic acids, as for example chloracetic acid methyl or ethyl esters, chloracetamide, chloracetonitrile or omega-chlorvaleronitrile. These carboxylic or sulfonic acids may contain, in addition to the halogens, any other substituents, as for example hydroxy or nitro groups. Suitable compounds of this kind are for example 4-chlor-5-nitrobenzene sulfonic acid, 5-chlor-2-nitrobenzoic acid, 2-nitro-5-chlor-benzene sulfonic acid, chlorolactic acid, or alpha-halogen-gamma-hydroxybutyric acids or their internal esters, such as alpha-chlor- or alpha-brom-gamma-butyrolactone. In so far as these compounds contain free carboxylic acid, sulfonic acid or mercapto groups, they are used in the form of their salts, as for example their alkali salts.

Among halogenated phthalocyanines there may be mentioned for example tetrabromocopper or tetrabromocobalt phthalocyanine, chloromethylated or bromoethylated phthalocyanines, such as mono-, di-, tri-, tetra- or penta-chloro- or bromo-methylphthalocyanines of copper, cobalt, iron, nickel, aluminum and other metals or the corresponding halogenated metal-free phthalocyanines.

Among suitable mercapto-carboxylic and -sulfonic acids there may be mentioned thioglycolic acid, thiolactic acid, beta-mercaptoproprionic acid, alpha- or gamma-mercaptobutyric acid, alpha-mercaptoisobutyric acid, alpha-mercaptoisovaleric acid, thiosalicylic acid, 3- or 4-mercaptobenzoic acid, 2-mercaptotoluic acid, 6-mercaptotoxylic acid, 2- or 8-mercaptonaphthoic acid, 4-mercaptophthalic acid, alpha-mercaptophenylacetic acid, thiophenol, thiocresol or thionaphthol sulfonic acids and their esters, amides or nitriles, as for example thioglycolic acid methyl or ethyl ester, thiosalicylic acid methyl or phenyl ester, thioglycolic acid amide, or the thiolactones derived from mercaptocarboxylic acids, such as gamma-thio-butyrolactone, gamma- or delta-thiovalerolactone. These compounds may contain, besides the mercapto group, still further substituents, for example amino groups, as in the case of cystein or amino- or methylamino-thiophenol sulfonic acids, or halogens, as in the case of 5- or 4-bromo-3-mercaptobenzoic acid. These compounds are also preferably used in the form of their salts, for example their alkali salts.

Water, alcohols, glycols, glycol semi-ethers, dioxane and the like or mixtures of the same may be employed as solvents or diluents. The reaction takes place at temperatures from 30° to 200° C., preferably at temperatures from 70° to 110° C., depending on the reactivity of the halogen atoms. In particular higher temperatures are usually necessary if nuclearly halogenated phthalocyanines are employed. It is preferable to carry out the reaction while excluding oxidising agents, for example in the presence of nitrogen.

The dyestuffs obtained are phthalocyanine or phthalocyaninemethylene thiocarboxylic or thiosulfonic acids which, depending on the number of acid groups which have entered into the phthalocyanine molecule, are more or less soluble in water in the form of their alkali, ammonium or amine salts. When employing functional derivatives of the halogencarboxylic or -sulfonic acids or of the mercapto-carboxylic or -sulfonic acids, water-insoluble dyestuffs are usually obtained which can if desired be converted into a watersoluble form by alkaline saponification. The water-insoluble products may, however, also be converted into watersoluble ternary sulfur compounds by treatment with suitable alkylating agents such as sulfuric or sulfonic acid esters.

The new dyestuffs, in so far as they are watersoluble, are suitable for dyeing and often also for printing textiles. The water-insoluble dyestuffs are in many cases capable of being used as vat dyestuffs. The free carboxylic or sulfonic acids can often be converted into pigment dyestuffs with heavy metal salts or basic dyestuffs. Dyestuffs soluble in organic solvents can also be prepared in this way.

The following examples will further illustrate this invention but the invention is not limited to these examples. The parts are by weight.

Example 1

A solution of 10 parts of the sodium salts of a mixture of metal-free di- and tri-(mercaptomethyl)-phthalocyanine in 100 parts of water has added to it an aqueous solution of 10 parts of sodium chloracetate and the mixture is heated for 1 to 2 hours at about 90° C. while excluding oxygen. The reaction mixture is then acidified with dilute hydrochloric acid, the resulting precipitate is filtered off by suction and washed with water. After drying, a blue-green dyestuff is obtained which dyes cotton blue-green shades from alkaline solution or from the vat.

Example 2

A mixture of 20 parts of di-(chlormethyl)-cobalt-phthalocyanine, 10 parts of thiourea and a little water is heated for a short time on the waterbath. Nitrogen is then led over the reaction mixture, a solution of 15 parts of sodium hydroxide in 50 parts of water is added and the whole stirred for about half an hour while heating gently. To the resulting alkaline solution of the sodium salt of di-(mercaptomethyl)-cobaltphthalocyanine there is added a solution of 20 parts of chloracetic acid in 50 parts of water and the whole is heated for 2 hours at 90° to 100° C. It is then acidified with dilute sulfuric acid and the resulting precipitate is filtered off by suction, washed with water and dried. The dyestuff thus obtained dyes cotton blue shades from an alkaline hydrosulfite vat.

A similar dyestuff is obtained by using the corresponding iron phthalocyanine.

*Example 3*

A mixture of 10 parts of a copper phthalocyanine polysulfide (obtained by reduction of a mixture of copper phthalocyanine di- and tri-sulfochlorides with iron and hydrochloric acid), 10 parts of 40% caustic soda solution and a solution of 6 parts of anhydrous sodium sulfide in 100 parts of water is heated for about 15 minutes at 90° C., until a clear solution has been formed. To the resulting alkaline solution of the sodium salts of the mixture of di- and tri-mercapto-copper-phthalocyanine there is added a concentrated aqueous solution of 20 parts of chloracetic acid and the reaction mixture is heated for about 3 hours at 90° C. It is then acidified with dilute hydrochloric acid and the separated reaction product is boiled with water. The dyestuff is then taken up in aqueous ammonia and the solution evaporated to dryness. The dyestuff obtained dyes cotton green shades from aqueous solution.

*Example 4*

40 parts of a 40% caustic soda solution are introduced into a mixture of 27 parts of the addition product of tetra-(chlormethyl)-copper-phthalocyanine and thiourea and 150 parts of water while leading in nitrogen and the whole is heated on the waterbath until a clear solution has been formed. It is then allowed to cool somewhat, 20 parts of a 35% hydrochloric acid and 100 parts of ethyl alcohol are added, 12 parts of chloracetic acid methyl ester are allowed to drop in while stirring and the whole is stirred at 30° to 40° C. until the reaction is completed. The precipitate is then filtered off by suction and washed with water. A dyestuff is obtained which dissolves in tetrahydrofurane, butyrolactone, chloroform, benzyl alcohol, benzene, nitrobenzene and chlorinated benzenes to give a blue coloration.

20 parts of the dyestuff are heated with 100 parts of diethyl sulfate for half an hour at 90° C. and, after cooling, the reaction product is precipitated with acetone. A watersoluble dyestuff is obtained which dyes cotton blue shades from an aqueous solution. The dyestuff is also suitable for producing blue printed patterns on textiles.

*Example 5*

30 parts of 3-nitro-4-chlorbenzene-1-sulfonic acid are introduced into an alkaline solution of 20 parts of di-(mercaptomethyl)-cobalt-phthalocyanine in a mixture of 80 parts of water and 80 parts of glycol and the mixture is heated to 90° to 110° C. for several hours while stirring. After precipitation with hydrochloric acid, a dyestuff is obtained which dyes cotton greenish-blue shades from the vat.

*Example 6*

17 parts of the addition product of trichlor-copper-phthalocyanine and thiourea are heated on the waterbath for about 15 minutes with a solution of 8 parts of sodium hydroxide in 100 parts of water while leading through nitrogen. Then 50 parts of 1.4-butanediol and 17 parts of omega-chlorvaleronitrile are added and the mixture stirred for a further hour at the said temperature. After separating the reaction product and washing it with water, it is triturated with a little methanol and again filtered by suction. The air-dried dyestuff is heated for half an hour at 90° C. with 70 parts of diethyl sulfate and then precipitated with acetone. A watersoluble dyestuff is obtained which dyes cotton blue shades from aqueous solution. It is also suitable for printing textiles.

*Example 7*

12 parts of potassium 5-chlor-2-nitrobenzoate are added in a nitrogen atmosphere with a solution of 10 parts of the potassium salt of dimercapto-copper-phthalocyanine in 80 parts of water and the mixture heated for several hours at 100° C. The reaction product is then precipitated by the addition of mineral acid boiled with water, filtered off by suction and dried. A dyestuff is obtained which dyes cotton bluish-green shades from ammoniacal solution.

*Example 8*

A solution of 17 parts of sodium hydroxide in 100 parts of water is added to 20 parts of di-(chlormethyl)-cobalt-phthalocyanine which has been converted into the corresponding thiourea derivative by heating with concentrated aqueous thiourea solution, and the whole is heated for about 10 minutes on the waterbath under an atmosphere of nitrogen. After allowing the resulting solution of the sodium salt of di-(mercaptomethyl)-cobalt-phthalocyanine to cool, 20 parts of alpha-bromobutyrolactone are allowed to drop in at room temperature and the whole is further stirred for a short time. It is then acidified and the resulting precipitate is boiled with water. A dyestuff is obtained which dyes cotton blue shades from the vat.

By employing the corresponding iron or copper phthalocyanines instead of the said cobalt phthalocyanine, similar products are obtained.

*Example 9*

A mixture of 20 parts of di-(chlormethyl)-cobalt-phthalocyanine, 15 parts of the disodium salt of thioglycolic acid and 100 parts of ethylene glycol are heated for 3 to 4 hours at 90° to 100° C. in a nitrogen atmosphere. The reaction mixture is then acidified with dilute hydrochloric acid and the resulting precipitate is filtered off by suction, boiled with water, again filtered off by suction and dried. A dyestuff is obtained which dyes cotton blue shades from the vat.

*Example 10*

20 parts of thioglycolic acid are dissolved in 150 parts of a 20% alcoholic solution of sodium ethylate in an atmosphere of nitrogen and after introducing 20 parts of a finely powdered mixture of metal-free di- and tri-(chlormethyl)-phthalocyanine the whole is heated to boiling for several hours while stirring. The reaction product is then precipitated by the addition of dilute mineral acid, filtered off by suction and washed with hot water. After drying, a dyestuff powder is obtained which dyes cotton blue-green shades from alkaline solution or from the vat.

*Example 11*

20 parts of tetrabromocopper-phthalocyanine are introduced into 150 parts of glycol monoethyl ether and finely ground in a ball mill. Into the resulting fine suspension there is introduced an alcoholic solution of 20 parts of the disodium salt of gamma-mercaptobutyric acid and the whole heated for about 20 hours at 180° to 200° C. while stirring and leading in nitrogen. After cooling, the product is acidified and the deposited dyestuff is filtered off by suction and boiled with water. A dyestuff is obtained which dyes cotton blue shades from soda-alkaline solution.

*Example 12*

20 parts of gamma-thiobutyrolactone are introduced into a solution of 16 parts of sodium hydroxide in 80 parts of methanol under an atmosphere of nitrogen. A finely dispersed suspension of 20 parts of tetra-(chlormethyl)-copper-phthalocyanine in 100 parts of dioxane is then allowed to flow in and the mixture is heated for about an hour at 95° to 100° C. while stirring, the methanol thus being for the most part distilled off. The product is then acidified with dilute hydrochloric acid and the precipitate is filtered off by suction, boiled with water and dried. 25 parts of a dyestuff are obtained which dyes cotton blue shades from ammoniacal or soda-alkaline solution. With salts of alkaline earthmetals it forms difficultly-soluble lakes which can be used for dyeing paper or tapestries.

*Example 13*

A mixture of 25 parts of tri-(chlormethyl)-copper-phthalocyanine, 100 parts of 1,4-butanediol, 20 parts of thioglycolic acid methyl ester and 40 parts of a 25% solution of sodium methylate in methyl alcohol is heated at 100° to 105° C. while stirring in a current of nitrogen until the reaction is completed. The product is then diluted with water and the precipitate filtered off by suction, washed with hot water and dried. The dyestuff obtained is soluble in chlorbenzenes, nitrobenzene, gamma-butyrolactone or tetrahydrofurane.

10 parts of this dystuff are heated for about half an hour on the waterbath with 50 parts of dimethyl sulfate. The reaction mixture is cooled and the dyestuff precipitated with acetone; it is soluble in water and dyes cotton, acetate silk or wool blue shades from aqueous solution.

A similar dyestuff is obtained by using thioglycolic acid amide instead of thioglycolic acid methyl ester.

*Example 14*

20 parts of the sulfonic acid mixture obtained by sulfonation of 2-amino-5-methoxybenzthiazole in 25% oleum are heated to boiling for 2 hours with a solution of 30 parts of potassium hydroxide in 200 parts of ethyl alcohol. To the resulting dipotassium salt of 2-amino-4-methoxy-thiophenol sulfonic acid mixture there is added a suspension of 20 parts of a mixture of di- and tri-(chlormethyl)-cobalt-phthalocyanine in 100 parts of ethylene glycol, and the mixture is heated for some hours at 100° to 105° C. while stirring, the ethyl alcohol being for the most part allowed to distil off. The product is acidified with dilute hydrochloric acid and the deposited precipitate is filtered off by suction, boiled with water, again filtered by suction and dried. The dyestuff obtained dyes cotton blue shades from the vat.

*Example 15*

A mixture of 20 parts of the dipotassium salt of thiosalicylic acid, 20 parts of di-(chlormethyl)-cobalt-phthalocyanine and 120 parts of ethylene glycol is heated at 100° to 105° C. while stirring and leading through nitrogen until the reaction is completed. After working up in the usual way, a dyestuff is obtained which dyes cotton greenish-blue shades from the vat.

The dyestuff obtained from the corresponding iron phthalocyanine dyes cotton somewhat more greenish-blue shades from the vat than the dyestuff obtained according to the first paragraph of this example.

*Example 16*

A mixture of 20 parts of finely ground tri-(chlormethyl)-copper-phthalocyanine, 20 parts of the disodium salt of thioglycolic acid and 150 parts of ethylene glycol is heated for 2 to 3 hours at 100° C. while stirring and leading through nitrogen. The reaction mixture is then acidified with dilute hydrochloric acid and the resulting precipitate is separated and washed with hot water. The dry dyestuff powder is introduced into 100 parts of diethyl sulfate and the mixture heated for about 15 minutes at 90° C. After cooling, the dyestuff is precipitated with acetone. It dyes cotton or wool blue shades from an aqueous solution.

Instead of the disodium salt of thioglycolic acid, the corresponding barium salt may also be used, but the time of reaction must be increased.

*Example 17*

20 parts of the hydrochloride of copper phthalocyanine tetramethylisothiourea are introduced into 120 parts of 10% aqueous caustic soda solution while leading in nitrogen and the reaction mixture is heated at 90° C. until a clear solution has been formed. It is then allowed to cool, the excess alkali is neutralised with dilute hydrochloric acid, 100 parts of methyl alcohol and 16 parts of the ester of chloracetic acid and gamma-ethylhexanol are added and the whole is stirred at about 40° to 50° C. until the reaction is completed. A blue product is obtained which can be employed for coloring nitrocellulose lacquers.

*Example 18*

40 parts of gamma-thiobutyrolactone are dissolved in a solution of 5 parts sodium hydroxide in 100 parts of ethanol while leading nitrogen through the solution, and then 40 parts of di-(chlormethyl)-cobalt phthalocyanine dispersed in 300 parts of glycol are introduced and the mixture is stirred at 100° C. until a sample is soluble in an alkaline sodium hyposulfite solution, but remains practically insoluble in an aqueous solution of sodium hydroxide which is the case in about 3 hours. After working up the reaction mixture in the usual manner, a dyestuff is obtained which dyes cotton blue shades from the vat.

What I claim is:

1. A phthalocyanine compound selected from the class consisting of otherwise unsubstituted, halomethyl substituted, and mercaptomethyl substituted metal-phthalocyanines and metal-free phthalocyanines, and characterized by bearing in the phenylene nuclei of the fundamental phthalocyanine complex from one to two radicals of the type —CH$_2$—S—R—X, wherein R stands for a radical selected from the class consisting of lower alkylene, phenylene and naphthylene radicals and X for a group selected from the class consisting of carboxylic acid, carboxylic acid ester, carboxylic acid amide, cyano, sulfonic acid and sulfonic acid amide groups.

2. A halomethyl substituted metal phthalocyanine compound characterized by bearing in the phenylene nuclei of the fundamental phthalocyanine complex from one to two radicals of the type —CH$_2$—S—R—X, wherein R stands for an alkylene radical up to 4 carbon atoms and X for a carboxylic acid ester group.

3. An otherwise unsubstituted metal phthalocyanine compound characterized by bearing in the phenylene nuclei of the fundamental phthalocyanine complex from one to two radicals of the type —CH$_2$—S—R—X, wherein R stands for an alkylene radical up to 4 carbon atoms and X for a carboxylic acid group.

4. An otherwise unsubstituted metal phthalocyanine compound characterized by bearing in the phenylene nuclei of the fundamental phthalocyanine complex from one to two radicals of the type —CH$_2$—S—R—X, wherein R stands for a phenylene radical and X for a sulfonic acid group.

5. An otherwise unsubstituted metal phthalocyanine compound characterized by bearing in the phenylene nuclei of the fundamental phthalocyanine complex from one to two radicals of the type —CH$_2$—S—R—X, wherein R stands for a phenylene radical and X for a carboxylic acid group.

6. An otherwise unsubstituted cobalt phthalocyanine compound characterized by bearing in the phenylene nuclei of the fundamental phthalocyanine complex from one to two radicals of the type —CH$_2$—S—R—X, wherein R stands for an alkylene radical up to 4 carbon atoms and X for a carboxylic acid group.

7. An otherwise unsubstituted cobalt phthalocyanine compound characterized by bearing in the phenylene nuclei of the fundamental phthalocyanine complex from one to two radicals of the type —CH$_2$—S—CH$_2$—COOH.

8. An otherwise unsubstituted cobalt phthalocyanine compound characterized by bearing in the phenylene nuclei of the fundamental phthalocyanine complex from one to two radicals of the type

—CH$_2$—S—CH$_2$.CH$_2$.CH$_2$—COOH

9. An otherwise unsubstituted cobalt phthalocyanine compound characterized by bearing in the phenylene nuclei of the fundamental phthalocyanine complex from one to two radicals of the type

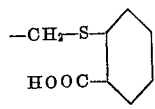

10. A halomethyl substituted copper phthalocyanine compound characterized by bearing in the phenylene nuclei of the fundamental phthalocyanine complex from one to two radicals of the type —$CH_2$—S—R—X, wherein R stands for an alkylene radical up to 4 carbon atoms and X for a carboxylic acid ester group.

11. An otherwise unsubstituted cobalt phthalocyanine compound characterized by bearing in the phenylene nuclei of the fundamental phthalocyanine complex from one to two radicals of the type —$CH_2$—S—R—X, wherein R stands for a phenylene radical and X for a sulfonic acid group.

12. An otherwise unsubstituted cobalt phthalocyanine compound characterized by bearing in the phenylene nuclei of the fundamental phthalocyanine complex from one to two radicals of the type —$CH_2$—S—R—X, wherein R stands for a phenylene radical and X for a carboxylic acid group.

References Cited in the file of this patent

UNITED STATES PATENTS

| | | |
|---|---|---|
| 2,542,328 | Haddock et al. | Feb. 20, 1951 |
| 2,670,265 | Heyna et al. | Feb. 23, 1954 |

FOREIGN PATENTS

| | | |
|---|---|---|
| 589,118 | Great Britain | June 11, 1947 |
| 633,478 | Great Britain | Dec. 19, 1949 |